US009163145B2

(12) United States Patent
Radloff

(10) Patent No.: US 9,163,145 B2
(45) Date of Patent: Oct. 20, 2015

(54) PROCESS FOR PREPARING PHOTORESPONSIVE HYBRID ORGANIC-INORGANIC PARTICLES

(75) Inventor: Corey J. Radloff, St. Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 45 days.

(21) Appl. No.: 14/126,860

(22) PCT Filed: Jun. 25, 2012

(86) PCT No.: PCT/US2012/043960
§ 371 (c)(1),
(2), (4) Date: Dec. 17, 2013

(87) PCT Pub. No.: WO2013/003264
PCT Pub. Date: Jan. 3, 2013

(65) Prior Publication Data
US 2014/0128608 A1 May 8, 2014

Related U.S. Application Data

(60) Provisional application No. 61/501,799, filed on Jun. 28, 2011.

(51) Int. Cl.
C07F 7/02 (2006.01)
C03C 3/04 (2006.01)
C09B 67/42 (2006.01)
C09D 5/02 (2006.01)
C09D 5/22 (2006.01)
C09K 9/02 (2006.01)

(52) U.S. Cl.
CPC ............ C09B 67/0071 (2013.01); C09D 5/024 (2013.01); C09D 5/22 (2013.01); C09K 9/02 (2013.01)

(58) Field of Classification Search
USPC ............................. 556/489, 465, 466; 501/53
See application file for complete search history.

(56) References Cited

U.S. PATENT DOCUMENTS

| 3,502,589 | A | 3/1970 | Newing, Jr. |
| 4,556,605 | A | 12/1985 | Mogami et al. |
| 5,637,258 | A | 6/1997 | Goldburt et al. |
| 5,728,758 | A | 3/1998 | Smith |
| 6,639,039 | B1 | 10/2003 | Fries |
| 6,709,707 | B2 | 3/2004 | Knobbe |
| 6,723,438 | B2 | 4/2004 | Chang et al. |
| 7,364,754 | B2 | 4/2008 | Prasad et al. |
| 8,133,508 | B2 | 3/2012 | Dumousseaux |
| 2003/0124564 | A1 | 7/2003 | Trau et al. |
| 2005/0244744 | A1 | 11/2005 | Kazmaier et al. |
| 2011/0260110 | A1 | 10/2011 | Mikami |

FOREIGN PATENT DOCUMENTS

| CN | 101701151 | 5/2010 |
| DE | 102006020190 | 11/2007 |
| FR | 2795085 | 12/2000 |
| KR | 20090067602 | 6/2009 |
| WO | WO 01/96511 | 12/2001 |
| WO | WO 2005/113677 | 12/2005 |
| WO | WO 2006/125736 A1 | 11/2006 |
| WO | WO 2007/177001 | 2/2007 |
| WO | WO 2008/018873 | 2/2008 |

OTHER PUBLICATIONS

Imai, Y. et al.: Synthesis of photoresponsive organic-inorganic polymer hybrids from azobenzene-modified poly(2-methyl-2-oxazoline). Macromolecules, vol. 31, pp. 532-534, 1998.*
Arkhireeva et al., "Synthesis of Organic-Inorganic Hybrid Particles by Sol-Gel Chemistry," Journal of Sol-Gel Science and Technology, (2004), 31, pp. 31-36.
Cordoncillo,E., et al., Room Temperature Synthesis of Hybrid Organic-Inorganic Nanocomposites Containing Eu2+, J. Mater. Chem., (1998), vol. 8, No. 3, pp. 507-509.
Dabbousi et al., "(CdSe)ZnS Core-Shell Quantum Dots: Synthesis and Characterization of a Size Series of Highly Luminescent Nanocrystallites," J. Phys. Chem B., (1997), 101, pp. 9463-9475.
Hines et al., "Synthesis and Characterization of Strongly Luminescing ZnS-Capped CdSe Nanocrystals," J. Phys. Chem., (1996), 100, pp. 468-471.
Hou, et al., "Thermal Decoloration Kinetics of Spirooxazines in Ormocer Coatings Prepared Via Sol-Gel Processing," J. Mater. Sci., (1996), 31, pp. 3427-3434.
Koo et al., "Real-Time Measurements of Dissolved Oxygen Inside Live Cells by Organically Modified Silicate Fluorescent Nanosensors," Anal. Chem., (2004), 76, pp. 2498-2505.
Murray et al., "Synthesis and Characterization of Nearly Monodisperse CdE (E = S, Se, Te) Semiconductor Nanocrystallites," J. Am. Chem. Soc., (1993), 115, pp. 8706-8715.
Pardo et al., "Photostability of a Photochromic Naphthopyran Dye in Different Sol-Gel Prepared Ormosil Coatings," Journal of Sol-Gel Science and Technology, (2006), 40, pp. 365-370.
Rottman et al., "Sol-Gel Entrapment of $E_T(30)$ in Ormosils. Interfacial Polarity-Fractality Correlation," Langmuir the ACS Journal of Surfaces and Colloids, Nov. 13, 1996, vol. 12, No. 23, pp. 5505-5508.
Rottman et al., "Polarities of Sol-Gel-Derived Ormosils and of Their Interfaces with Solvents," Chem. Mater., (2001), 13, pp. 3631-3634.
Sanchez et al., "Optical Properties of Functional Hybrid Organic-Inorganic Nanocomposites**," Advanced Materials, Dec. 3, 2003, vol. 15, Nos. 22&23, pp. 1969-1994.
Schaudel et al., "Spirooxazine- and Spiropyran-Doped Hybrid Organic-Inorganic Matrices with Very Fast Photochromic Responses," J. Mater. Chem., (1997), 7(1), pp. 61-65.
Shibata.S., et al., "Laser Emission from Dye-Doped Organic-Inorganic Particles of Microcavity Structure," Journal of Sol-Gel Science and Technology, (1997), 8, pp. 959-964.
International Search Report for PCT/US2012/043960, mailed on Aug. 9, 2012, 4 pages.

* cited by examiner

Primary Examiner — Charanjit Aulakh
(74) Attorney, Agent, or Firm — Jean A. Lown

(57) ABSTRACT

A process for preparing photoresponsive hybrid organic-inorganic particles comprises (a) combining (1) at least one organosilane compound comprising at least two silicon-bonded groups selected from hydroxyl groups, hydrolyzable groups, and combinations thereof and (2) at least one neat photoactive material, to form a ceramic precursor composition; and (b) allowing or inducing hydrolysis of the hydrolyzable groups and condensation of the organosilane compound to form hybrid organic-inorganic particles comprising the photoactive material.

11 Claims, No Drawings

PROCESS FOR PREPARING PHOTORESPONSIVE HYBRID ORGANIC-INORGANIC PARTICLES

CROSS REFERENCE TO RELATED APPLICATIONS

This application claims the priority of U.S. Provisional Patent Application No. 61/501,799, filed on Jun. 28, 2011.

TECHNICAL FIELD

This invention relates to processes for preparing hybrid organic-inorganic particles comprising at least one photoactive material.

BACKGROUND

Photodynamic therapy can be used for the treatment of a variety of oncological, cardiovascular, dermatological, and ophthalmic diseases. In cancer treatment, for example, photoactive materials can be preferentially localized in tumor tissues upon systemic administration and then can be irradiated to produce reactive species that can irreversibly damage cells. Under appropriate conditions, such a method can selectively destroy diseased tissues without damaging adjacent healthy tissues.

Many photoactive drugs and dyes are hydrophobic (due to at least some organic content), however, and this has required the development of various different delivery vehicles or carriers to enable the stable dispersion of such photoactive compounds into aqueous systems. Carriers have included oil-dispersions (micelles), liposomes, polymeric micelles, hydrophilic drug-polymer complexes, and so forth. Some such approaches have elicited hypersensitivity reactions, and others have suffered from relatively poor drug loading, self-aggregation of the drug, and/or accumulation of the drug in normal tissues.

Ceramic-based nanoparticles such as organically-modified silicates have also been doped with photoactive drugs or dyes for use as delivery vehicles. Such nanoparticles are generally quite stable, can effectively protect doped molecules from extreme pH and temperature conditions, can be easily functionalized with various different surface-modifying groups, and at least some are known for their compatibility with biological systems. Processes for the preparation of such doped ceramic-based nanoparticles have typically involved the use of organic solvent (which can hinder particle formation), however, and have suffered from other drawbacks such as the need for multiple process steps, multiple catalysts, formation of micellar compositions, and/or production of core-shell particle structures.

SUMMARY

Thus, we recognize that there exists an ongoing need for photoresponsive hybrid organic/inorganic particles (and, in particular, photoresponsive organically-modified silicate nanoparticles) that can meet the performance requirements of a variety of different applications and for relatively simple, efficient, and cost-effective processes for their preparation. Preferred particle preparation processes will provide efficient incorporation of photoactive material(s) (for example, relatively complete incorporation), while preferably reducing or eliminating the need for organic solvent relative to prior art processes.

Briefly, in one aspect, this invention provides a process for preparing photoresponsive hybrid organic-inorganic particles. The process comprises (a) combining (1) at least one organosilane compound comprising at least two silicon-bonded groups selected from hydroxyl groups, hydrolyzable groups, and combinations thereof and (2) at least one neat (that is, not diluted or mixed with organic solvent) photoactive material, to form a ceramic precursor composition; and (b) allowing or inducing hydrolysis of the hydrolyzable groups and condensation of the organosilane compound to form hybrid organic-inorganic particles comprising the photoactive material.

Preferably, the organosilane is also in neat form, so as to provide a neat ceramic precursor composition.

The hydrolysis and condensation preferably can be effected by combining the ceramic precursor composition with an aqueous composition comprising at least one catalyst and, optionally, at least one surfactant. Preferably, the organosilane is selected from monoorganosilanes, diorganosilanes, and combinations thereof; and/or the photoactive material is selected from photoactive drugs, dyes, rare earth-doped metal oxide nanoparticles, metal nanoparticles, semiconductor nanoparticles, and combinations thereof.

It has been discovered that photoresponsive hybrid organic-inorganic particles can be prepared by a simple process that comprises directly dispersing or dissolving neat photoactive material(s) in organosilane(s). Surprisingly, the process can provide efficient incorporation (in preferred embodiments, relatively complete incorporation) of the photoactive material(s) in the resulting hybrid particles, even when both the photoactive material(s) and the organosilane(s) are used in neat form, and even without covalent attachment of the photoactive material(s) to the particle (thereby avoiding the need for one or more additional chemical modification process steps).

Since the process of the invention can be carried out without first dissolving or dispersing the photoactive material(s) in organic solvent, the process can be relatively more cost-effective and environmentally friendly than prior art preparation processes, while also reducing or eliminating the interference with particle formation that can be associated with the use of organic solvent. The process is essentially a simple "one-pot" or "one-step" process that does not require formation of micellar compositions or core-shell particle structures to achieve both particle formation and photoactive material incorporation.

The resulting photoresponsive hybrid organic-inorganic particles can be used in a number of different applications including, for example, use in photodynamic therapy applications, use as optical sensors, use as indicators, and so forth. Thus, at least some embodiments of the process of the invention not only can provide photoresponsive hybrid organic/inorganic particles (and, in particular, photoresponsive organically-modified silicate nanoparticles) that can fulfill the performance requirements of a variety of different applications but also can meet the above-described, ongoing need for relatively simple, efficient, and cost-effective processes for their preparation, while reducing or eliminating the need for organic solvent relative to prior art processes.

DETAILED DESCRIPTION

In the following detailed description, various sets of numerical ranges (for example, of the number of carbon atoms in a particular moiety, of the amount of a particular component, or the like) are described, and, within each set, any lower limit of a range can be paired with any upper limit of a range. Such numerical ranges also are meant to include all numbers subsumed within the range (for example, 1 to 5 includes 1, 1.5, 2, 2.75, 3, 3.80, 4, 5, and so forth).

As used herein, the term "and/or" means one or all of the listed elements or a combination of any two or more of the listed elements.

The words "preferred" and "preferably" refer to embodiments of the invention that may afford certain benefits under certain circumstances. Other embodiments may also be preferred, however, under the same or other circumstances. Furthermore, the recitation of one or more preferred embodiments does not imply that other embodiments are not useful, and is not intended to exclude other embodiments from the scope of the invention.

The term "comprises" and variations thereof do not have a limiting meaning where these terms appear in the description and claims.

As used herein, "a," "an," "the," "at least one," and "one or more" are used interchangeably.

The above "Summary of the Invention" section is not intended to describe every embodiment or every implementation of the invention. The detailed description that follows more particularly describes illustrative embodiments. Throughout the detailed description, guidance is provided through lists of examples, which examples can be used in various combinations. In each instance, a recited list serves only as a representative group and should not be interpreted as being an exclusive list.

DEFINITIONS

As used in this patent application:

"actinic radiation" means radiation in any wavelength range of the electromagnetic spectrum (actinic radiation is typically in the ultraviolet wavelength range, in the visible wavelength range, in the infrared wavelength range, or combinations thereof; any suitable energy source known in the art can be used to provide the actinic radiation);

"acyl" means a monovalent group of formula —(C=O)R where R is selected from alkyl, aryl, and combinations thereof;

"acyloxy" means a monovalent group of formula —O(C=O)R where R is selected from alkyl, aryl, and combinations thereof;

"catenated heteroatom" means an atom other than carbon (for example, oxygen, nitrogen, or sulfur) that replaces one or more carbon atoms in a carbon chain (for example, so as to form a carbon-heteroatom-carbon chain or a carbon-heteroatom-heteroatom-carbon chain);

"heteroorganic" means an organic group or moiety (for example, an alkyl or aryl group) containing at least one heteroatom (preferably, at least one catenated heteroatom);

"nanoparticle" means a particle (a primary particle or a particle agglomerate) having an average particle diameter in the range of 0.1 to 1000 nanometers such as in the range of 0.1 to 100 nanometers or in the range of 1 to 100 nanometers (the term "diameter" refers not only to the diameter of substantially spherical particles but also to the longest dimension of non-spherical particles; suitable techniques for measuring the average particle diameter include, for example, scanning tunneling microscopy, light scattering, and transmission electron microscopy);

"neat" means not diluted or mixed with organic solvent; and

"photoactive" means responsive (for example, chemically or electrically) to actinic radiation (for example, some photoactive materials can absorb such radiation and then exhibit fluorescence (fluorescent dyes) or a change in color (photochromic dyes)).

Organosilane Compounds

Organosilane compounds that are suitable for use in carrying out the process of the invention include those that comprise at least two silicon-bonded groups selected from hydroxyl groups, hydrolyzable groups, and combinations thereof. Preferably, the organosilanes are selected from monoorganosilanes, diorganosilanes, and combinations thereof (more preferably, monoorganosilanes and combinations thereof).

A class of useful organosilane compounds includes those that can be represented by the following general formula:

$$Si(R)_{4-p}-(X)_p \qquad (I)$$

wherein each R is independently an organic or heteroorganic group (preferably, an organic or heteroorganic group independently selected from alkyl (preferably, having 1 to about 4 carbon atoms), alkenyl, acyl (preferably, having 1 to about 3 carbon atoms), cycloalkyl, aryl (preferably, phenyl), heteroalkyl, heteroalkenyl, heterocycloalkyl, heteroaryl, and combinations thereof); each X is independently selected from a halogen atom, a hydrogen atom, acyloxy, alkoxy, hydroxyl, and combinations thereof; and p is an integer of 2 or 3 (preferably, 3). The halogen atom can be selected from fluorine, chlorine, bromine, iodine, and combinations thereof (preferably, chlorine, bromine, iodine, and combinations thereof; more preferably, chlorine, bromine, and combinations thereof; most preferably, chlorine). Heteroatom(s) in R can include oxygen, sulfur, nitrogen, phosphorus, and combinations thereof (preferably, oxygen, sulfur, and combinations thereof; more preferably, oxygen). R can contain fluorine, provided that it is separated from silicon by at least two carbon atoms. R can contain silicon (preferably, silicon that it is bonded to hydroxyl or a hydrolyzable group).

Each R is preferably independently selected from alkyl, aryl, heteroalkyl, heteroaryl, and combinations thereof (more preferably, alkyl, aryl, heteroalkyl, and combinations thereof; even more preferably, alkyl, aryl, and combinations thereof; still more preferably, aryl; most preferably, phenyl). Preferred X groups include halogen, hydrogen, alkoxy, hydroxyl, and combinations thereof (more preferably, halogen, alkoxy, hydroxyl, and combinations thereof; even more preferably, alkoxy, hydroxyl, and combinations thereof; still more preferably, alkoxy; most preferably, methoxy or ethoxy).

Representative examples of useful organosilane compounds include dialkyldialkoxysilanes; alkyltrialkoxysilanes (for example, methyltrimethoxysilane, methyltriethoxysilane, ethyltrimethoxysilane, ethyltriethoxysilane, n-propyltrimethoxysilane, n-propyltriethoxysilane, isopropyltrimethoxysilane, isopropyltriethoxysilane, butyltrimethoxysilane, butyltriethoxysilane, hexyltrimethoxysilane, hexyltriethoxysilane, n-octyltrimethoxysilane, n-octyltriethoxysilane, isooctyltrimethoxysilane, isooctyltriethoxysilane, dodecyltrimethoxysilane, dodecyltriethoxysilane, octadecyltrimethoxysilane, and octadecyltriethoxysilane); alkenyltrialkoxysilanes (for example, vinyl silanes such as vinyltrimethoxysilane, vinyltriethoxysilane, vinyltriisopropoxysilane, vinyltri-t-butoxysilane, vinyltriisobutoxysilane, and vinyltris(2-methoxyethoxy)silane); acyltrialkoxysilanes; cycloalkyltrialkoxysilanes; diaryldialkoxysilanes; aryltrialkoxysilanes (for example, phenyltrimethoxysilane, phenyltriethoxysilane, p-tolyltrimethoxysilane, and p-tolyltriethoxysilane); diheteroalkyldialkoxysilanes; heteroalkyltrialkoxysilanes (for example, polyethyleneoxytrimethoxysilane, polyethyleneoxytriethoxysilane, and mercaptoalkyltrialkoxysilanes such as 3-mercaptopropyltrimethoxysilane); heteroalkenyltrialkoxysilanes (for example, methacryloxyalkyltrialkoxysilanes or acryloxyalkyltrialkoxysilanes such as 3-methacryloxypropyltrimethoxysilane, 3-acryloxypropyltrimethoxysilane, 3-methacryloxymethyltriethoxysilane, 3-methacryloxymethyltrimethoxysilane, and 3-(methacryloxy)propyltriethoxysilane); heterocycloalkyltrialkoxysilanes; diheteroaryldialkoxysilanes; heteroaryltrialkoxysilanes; and combinations thereof.

Preferred organosilane compounds include alkyltrialkoxysilanes, aryltrialkoxysilanes, heteroalkyltrialkoxysilanes, heteroaryltrialkoxysilanes, and combinations thereof (more preferably, alkyltrialkoxysilanes, aryltrialkoxysilanes, heteroalkyltrialkoxysilanes, and combinations thereof; even more preferably, methyltrimethoxysilane, methyltriethoxysilane, isooctyltrimethoxysilane, isooctyltriethoxysilane, phenyltrimethoxysilane, phenyltriethoxysilane, polyethyleneoxytrimethoxysilane, polyethyleneoxytriethoxysilane, and combinations thereof; still more preferably, isooctyltrimethoxysilane, isooctyltriethoxysilane, phenyltrimethoxysilane, phenyltriethoxysilane, polyethyleneoxytrimethoxysilane, polyethyleneoxytriethoxysilane, and combinations thereof; most preferably, phenyltrimethoxysilane, phenyltriethoxysilane, and combinations thereof).

The organosilane compounds can be used in the process of the invention singly or in the form of mixtures of different compounds. The organosilane compounds can be prepared by known synthetic methods, and some (for example, phenyltrimethoxysilane, Gelest, Inc., Morrisville, Pa.) are commercially available. Depending upon the particular application, at least some of the organic or heterorganic groups of the organosilane compounds (for example, the R groups in Formula I above) can be selected to compatibilize the resulting hybrid organic-inorganic particles with particular solvents or other chemical compositions or environments (for example, to aid in particle dispersibility).

Optionally, the organosilane compound(s) can be used in the process of the invention in combination with one or more other ceramic precursor compounds. For example, silane esters (for example, triethoxysilane, tetraethoxysilane (also known as tetraethylorthosilicate (TEOS)), tetramethoxysilane (also known as tetramethylorthosilicate (TMOS)), and the like) and/or compounds that can serve as precursors to metal oxides such as alumina, titania, zirconia, and the like (for example, titanium alkoxides, zirconium alkoxides, zirconium acetate, and the like) can be included in the ceramic precursor composition (either singly or in the form of mixtures; preferably, in minor amount by weight, relative to the total weight of organosilane(s) and other ceramic precursor compound(s) (for example, less than about 50 percent, 40 percent, 35 percent, 25 percent, 15 percent, 10 percent, or 5 percent by weight)). Such ceramic precursor compounds can be prepared by known synthetic methods, and some (for example, titanium alkoxides and zirconium alkoxides, Aldrich, St. Louis, Mo.) are commercially available. The other ceramic precursor compounds can be hydrolyzed and condensed along with the organosilanes (so as to form a mixed ceramic particle) or, alternatively, can be separately hydrolyzed and condensed (so as to form either the core or the shell of a core-shell structure).

Preferably, the organosilane compounds are used in the process of the invention without the addition of other non-silane ceramic precursor compounds, so as to provide organically-modified silicates in the form of organically-modified silica (Ormosil) particles (more preferably, Ormosil nanoparticles).

Photoactive Materials

Photoactive materials that are suitable for use in carrying out the process of the invention include photoactive organic and inorganic materials and combinations thereof. Useful photoactive materials include photoactive dyes, drugs, rare earth-doped metal oxide nanoparticles, metal nanoparticles, semiconductor nanoparticles, and the like, and combinations thereof. Preferred photoactive materials include photoactive dyes, rare earth-doped metal oxide nanoparticles, metal nanoparticles, semiconductor nanoparticles, and combinations thereof (more preferably, photoactive dyes, metal nanoparticles, semiconductor nanoparticles, and combinations thereof; most preferably, photoactive dyes and combinations thereof). The process of the invention can be particularly useful in incorporating photoactive materials having at least some organic or organometallic content (for example, photoactive drugs, photoactive dyes, and combinations thereof; preferably, photoactive dyes and combinations thereof).

Useful photoactive drugs include anticancer drugs (for example, Hypocrellin A and Porfimer Sodium (sold under the trade name Photofrin™, Pinnacle Biologics, Inc., Bannockburn, Ill.) and the like, and combinations thereof. Such drugs can be isolated or synthesized by known methods, and some are commercially available.

Useful photoactive dyes include photochromic dyes, fluorescent dyes, chemiluminescent dyes, and the like, and combinations thereof. Such dyes can be synthesized by known methods, and some (for example, fluorescein, Aldrich, St. Louis, Mo.) are commercially available. Preferred photoactive dyes include photochromic dyes, fluorescent dyes, and combinations thereof (more preferably, photochromic dyes and combinations thereof).

Representative examples of useful photoactive dyes include fluorescent dyes such as fluorescein and its derivatives, rhodamine and its derivatives, coumarins, benzocoumarins, xanthenes, benzoxanthenes, phenoxazines, benzophenoxazines, napthalimides, naphtholactams, azlactones, methines, oxazines, thiazines, diketopyrrolopyrroles, quinacridones, thio-epindolines, lactamimides, diphenylmaleimides, acetoacetamides, imidazothiazines, benzanthrones, phthalimides, benzotriazoles, pyrimidines, pyrazines, triazines, and the like; chemiluminescent dyes such as peroxidase, luciferase, sulfonamide, 5-amino-2,3-dihydro-1,4-phthalazinedione (known as Luminol), cyalume, oxalyl chloride, tris(bipyridine)ruthenium(II) chloride, pyrogallol, peroxyoxalates, aryl oxylates, acridinium esters, dioxetanes, lucigenin, and the like; photochromic dyes such as spiropyrans, spirooxazines, spirothiopyrans, stilbenes, aromatic azo compounds, chromenes (including napthopyrans), bisimidazoles, spirodihydroindolizines, quinones, perimidinespirocyclohexadienones, viologens, fulgides and fulgimides, diarylethenes, triarylmethanes, anils, and the like (including the photochromic materials described in U.S. Patent Application Publication No. U.S. 2005/0244744 A1 (Kazmaier et al.), the descriptions of which materials are incorporated herein by reference); and the like; and combinations thereof. Preferred photoactive dyes include napthalimides, spiropyrans, spirooxazines, chromenes, and combinations thereof (more preferably, napthalimides, chromenes, and combinations thereof; most preferably, chromenes and combinations thereof).

Useful photoactive rare earth-doped metal oxide nanoparticles include nanoparticles of metal oxides such as zirconium oxide, yttrium oxide, zinc oxide, copper oxide, lanthanum oxide, gadolinium oxide, praseodymium oxide, and the like, and combinations thereof that are doped with rare earths such as lanthanum, cerium, praseodymium, neodymium, samarium, europium, gadolinium, terbium, dysprosium, holmium, erbium, thulium, and the like, and combinations thereof. Such rare earth-doped metal oxides can be prepared by known methods (for example, the methods described in U.S. Pat. No. 5,637,258 (Goldburt et al.)). The rare earth is often present in an amount of about 1 to 30 molar percent or about 1 to 20 molar percent based on the total moles of metal oxide and rare earth dopant. Preferred photoactive rare earth-doped metal oxides include lanthanum, yttrium, cerium, and combinations thereof.

Useful photoactive metal nanoparticles include those of the noble and coinage metals such as gold, silver, platinum, palladium, iridium, rhenium, mercury, ruthenium, osmium, copper, nickel, and the like, and combinations thereof. Such metal nanoparticles can be prepared by known methods, and some (for example, silver and gold) are commercially available. Preferred photoactive metal nanoparticles include those of gold, silver, copper, nickel, platinum, palladium, and combinations thereof.

Suitable photoactive semiconductor nanoparticles (sometimes termed "quantum dots") for use in the process of the invention include those that comprise one or more semiconductor materials. Useful semiconductor materials include, for example, Group II-VI semiconductors (for example, ZnS, ZnSe, ZnTe, CdS, CdSe, CdTe, HgS, HgSe, HgTe, MgTe, and the like), Group III-V semiconductors (for example, GaN, GaP, GaAs, GaSb, InN, InP, InAs, InSb, AlAs, AlP, AlSb, AlS, and the like), Group IV semiconductors (for example, Ge, Si, and the like), Group I-VII semiconductors (for example, CuCl, AgI, and the like), alloys thereof, and mixtures thereof (for example, ternary and quaternary mixtures).

Preferred photoactive semiconductor nanoparticles comprise a Group IV or a Group II-VI semiconductor (more preferably, a Group II-VI semiconductor; most preferably, a Group II-VI semiconductor comprising zinc or cadmium). Particularly preferred photoactive semiconductor nanoparticles comprise a "core" of one or more first semiconductor materials surrounded by a "shell" of a second semiconductor material ("core/shell" semiconductor nanoparticles).

Methods for preparing semiconductor nanoparticles are known (and some semiconductor nanoparticles are commercially available). For example, monoelement semiconductors such as silicon or germanium and compound semiconductors such as GaAs, InP, CdSe, or ZnS can be synthesized using a wet chemical process based on standard colloidal chemistry. The general synthesis, for example, involves the rapid addition (for example, by injection) of molecular precursors of the semiconductor (for example, $Cd(CH_3)_2$ and $(TMS)_2Se$ for CdSe) into a hot coordinating solvent (for example, an amine or phosphine) that can serve to control growth and prevent aggregation of the nanoparticles (see, for example, Murray et al., *J. Am. Chem. Soc.* 115:8706 (1993)). In view of the highly reactive nature of the precursors and/or to prevent or minimize oxidation of the growing nanoparticles, the synthesis is generally carried out in an inert atmosphere (for example, a nitrogen atmosphere). Core/shell nanoparticles can be synthesized, for example, by following general methods developed by Hines et al. (*J. Phys. Chem.* 100:468 (1996)) and Dabbousi et al. (*J. Phys. Chem B* 101:9463 (1997)).

In many embodiments of the process of the invention, the above-described photoactive nanoparticles (rare earth-doped metal oxide, metal, or semiconductor) can have an average diameter that is no greater than about 100 nanometers, no greater than about 50 nanometers, no greater than about 40 nanometers, no greater than about 30 nanometers, no greater than about 20 nanometers, or no greater than about 10 nanometers. The average diameter of the nanoparticles is typically at least about 1 nanometer, at least about 2 nanometers, at least about 3 nanometers, or at least about 4 nanometers. In some embodiments, the average diameter of the nanoparticles is in a range of about 1 to about 100 nanometers, in the range of about 1 to about 50 nanometers, in the range of about 1 to about 20 nanometers, in the range of about 1 to about 10 nanometers, or in the range of about 2 to about 10 nanometers.

Process and Resulting Particles

The process of the invention can be carried out by (a) combining (1) at least one organosilane compound comprising at least two silicon-bonded groups selected from hydroxyl groups, hydrolyzable groups, and combinations thereof and (2) at least one neat (that is, not diluted or mixed with organic solvent) photoactive material, to form a ceramic precursor composition; and (b) allowing or inducing hydrolysis of the hydrolyzable groups and condensation of the organosilane compound. The process can be effectively carried out at any of a wide range of temperatures including ambient temperatures (for example, a room temperature of about 23° C.) and higher than ambient temperatures (for example, temperatures achieved by heating). Although minor amounts (by weight, relative to the total weight of the ceramic precursor composition; for example, less than about 25 percent, 20 percent, 15 percent, 10 percent, or 5 percent by weight) of organic solvent can be tolerated without significantly interfering with particle formation, the organosilane (or a mixture of organosilane(s) and one or more other ceramic precursor compounds) also preferably is combined in neat form, so as to provide a neat ceramic precursor composition. If organic solvent is utilized, however, it is preferably relatively non-polar in nature and relatively immiscible with water.

The organosilane(s) and the photoactive material(s) can be combined in any of a wide range of ratios, depending upon the particular application, the nature of the two components, and the degree of photoresponsiveness desired in the resulting hybrid organic-inorganic particles. Generally, the photoactive material(s) can be dispersed or dissolved in the organosilane(s) so as to produce a ceramic precursor composition containing a non-zero amount up to about 5 weight percent (for example, from about 0.01 to about 5 weight percent) photoactive material (preferably, from about 0.1 to about 2.5 weight percent; more preferably from about 0.5 to about 1 weight percent), based upon the total weight of the ceramic precursor composition.

Hydrolysis and condensation of the organosilane compound can be effected by essentially any known (for example, in the hydrolytic sol-gel art) or hereafter-developed method of providing contact with water (preferably, in the presence of at least one catalyst). Useful catalysts include bases, acids, buffered solutions thereof, and combinations thereof. Bases can be preferred catalysts (for example, when working with photoactive materials such as dyes that can be attacked or degraded by acid).

Bases that are suitable for use as catalysts in carrying out the process of the invention include those that can donate a hydroxyl ion or that are nucleophilic. Useful bases include tertiary amines (for example, trialkylamines such as trimethylamine, triethylamine, tetramethylethylenediamine, and combinations thereof), pyridine, substituted (for example, with one or more substituents such as methyl or ethyl groups) pyridines (for example, picolines), sterically-hindered secondary amines, phosphines (for example, trimethyl phosphine, dimethylethyl phosphine, methyldiethyl phosphine, and combinations thereof), arsines (for example, trimethyl arsine), hydroxyl group-containing bases (for example, sodium hydroxide, potassium hydroxide, ammonium hydroxide, tetramethylammonium hydroxide, and combinations thereof), and the like, and combinations thereof.

Preferred bases include tertiary amines, pyridine, substituted pyridines, hydroxyl group-containing bases, and combinations thereof. More preferred bases include hydroxyl group-containing bases (preferably, sodium hydroxide, ammonium hydroxide, and combinations thereof), tertiary amines (preferably, trimethylamine), and combinations thereof (most preferably, hydroxyl group-containing bases and combinations thereof). Most preferred is sodium hydroxide (for example, due to its relatively low cost).

Acids that are suitable for use as catalysts in carrying out the process of the invention include those that can readily protonate silicon alkoxides. Useful acids include hydrochloric acid, nitric acid, acetic acid, hydrofluoric acid, sulfuric acid, oxalic acid, and combinations thereof. Preferred acids include nitric acid, acetic acid, hydrochloric acid, and combinations thereof.

Mixtures of catalysts can be utilized. If desired, different catalysts can be used for hydrolysis and condensation, respectively. For example, an acid can be used to catalyze hydrolysis, and a base can be used to catalyze condensation. Bases, however, generally can be preferred as catalysts for both reactions.

Optionally, hydrolysis and condensation can be effected in the presence of at least one surfactant. Useful surfactants include ionic surfactants, non-ionic surfactants, and combinations thereof. Preferred surfactants include ionic surfactants (for example, cationic, anionic, or zwitterionic surfactants) and combinations thereof.

In a preferred embodiment of the process of the invention, the hydrolysis and condensation can be effected by combining the ceramic precursor composition with an aqueous composition comprising at least one catalyst (preferably, at least one base) and, optionally, at least one surfactant. The compositions preferably can be combined by pumping (for example, using a syringe pump or a parastaltic pump) or otherwise feeding the ceramic precursor composition into the aqueous composition at a controlled rate, with continuous agitation or stirring. The catalyst can be utilized in essentially any amount that is catalytically effective. For example, the catalyst can constitute from 0 to about 1 weight percent (preferably, from about 0.01 to about 0.1 weight percent; more preferably, from about 0.02 to about 0.05 weight percent) of the total combined weight of the ceramic precursor composition and the aqueous composition (or its components, if added to the ceramic precursor composition separately rather than as a preferred, pre-formed aqueous composition).

Use of a surfactant can be preferred (for example, when smaller particles such as nanoparticles are desired). The amount of surfactant that can be included will vary (for example, depending upon the nature of the surfactant(s)). Amounts of surfactant in the range of about 0.5 to about 15 weight percent (based upon the total combined weight of the ceramic precursor composition and aqueous composition or its components), however, can often be useful (with amounts in the range of about 1.5 to about 10.5 weight percent being preferred, and amounts in the range of about 3.5 to about 7.5 weight percent being more preferred).

The total amount of water that can be included can also vary but generally can be equal to, or in excess of (preferably, in excess of), the stoichiometric amount sufficient to fully hydrolyze the hydrolyzable groups of the organosilane(s) (and the hydrolyzable groups of any other ceramic precursor compounds that are included in the ceramic precursor composition). Although minor amounts (by weight, relative to the total weight of the aqueous composition; for example, less than about 50 percent, 40 percent, 30 percent, 20 percent, 10 percent, or 5 percent by weight) of organic solvent (for example, a polar organic solvent such as an alcohol that is relatively immiscible with the ceramic precursor composition) can be tolerated in the aqueous composition, the aqueous composition preferably contains no organic solvent. Most preferably, no organic solvent is utilized in carrying out the process of the invention.

Minor amounts of optional components (reactive or non-reactive) can be included in the ceramic precursor composition or the aqueous composition (preferably, the ceramic precursor composition) or can be added to the combination thereof to impart particular desired particle properties for particular uses. Useful compositions can comprise conventional additives such as, for example, other catalysts, other emulsifiers, stabilizers, inhibitors, anti-oxidants, flame retardants, colorants, and the like, and mixtures thereof.

Hydrolysis and condensation of the organosilane(s) (and, optionally, other ceramic precursor compounds) results in the formation of hybrid organic-inorganic particles comprising the photoactive material(s). Preferably, the photoactive material(s) are entrapped in the particles (more preferably, entrapped substantially within the particles). Such entrapment can be by either physical attachment (for example, by adsorption or by mechanical entanglement) or chemical attachment (for example, when the photoactive material(s) are functionalized with at least one group that is co-reactive with the organosilane(s), by covalent bonding).

Preferably, the photoactive material(s) are entrapped by physical attachment, without the need for functionalization to permit covalent bonding. In at least some preferred embodiments of the process of the invention, the photoactive material(s) can become sufficiently physically entrapped that the resulting hybrid organic-inorganic particles (for example, when placed in solvent or in resin) can exhibit stable optical properties (or even somewhat improved photochromic dye switching performance, relative to the corresponding free, non-entrapped photochromic dye in solvent or resin), surprisingly without the need for covalent bonding.

In many embodiments of the process of the invention, the resulting hybrid organic-inorganic particles can have an average diameter that is no greater than about 4000 nanometers, no greater than about 1000 nanometers, no greater than about 400 nanometers, no greater than about 300 nanometers, no greater than about 200 nanometers, no greater than about 100 nanometers, or no greater than about 50 nanometers. The average diameter of the particles typically can be at least about 1 nanometer, at least about 2 nanometers, at least about 3 nanometers, at least about 4 nanometers, or at least about 5 nanometers. In some preferred embodiments, the average diameter of the particles is in a range of about 1 to about 100 nanometers, in the range of about 10 to about 100 nanometers, in the range of about 20 to about 100 nanometers, in the range of about 30 to about 100 nanometers, in the range of about 40 to about 100 nanometers, or in the range of about 50 to about 100 nanometers. In other useful embodiments, the average diameter of the particles can be in a range of about 1 to about 50 nanometers, in the range of about 1 to about 20 nanometers, in the range of about 1 to about 10 nanometers, or in the range of about 2 to about 10 nanometers.

The resulting particles can be utilized in the form of a dispersion or sol, if desired, or can be isolated from the dispersion prior to use. For example, the particles can be isolated by phase exchange into organic solvent or by precipitation, followed by filtration. The isolated particles optionally can be washed to remove residual surfactant and/or can be dried.

The characteristics of the resulting particles can be evaluated by ultraviolet-visible spectroscopy (absorption characteristics), X-ray diffraction (crystalline particle size, crystalline phase, and particle size distribution), transmission electron microscopy (particle sizes and shapes, crystalline phase, and particle size distributions), high performance liquid chromatography (HPLC; degree of incorporation of photoactive material), thermogravimetric analysis (TGA; organic content), and dynamic light scattering (particle sizes and degree of agglomeration).

The resulting photoresponsive hybrid organic-inorganic particles can be used in a number of different applications. For example, the particles can be used in photodynamic therapy applications, as optical sensors, as indicators, and in other similar applications for photoresponsive hybrid solids.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials and Conditions

Unless otherwise noted, all parts, percentages, ratios, etc., in the examples and in the remainder of the specification are by weight. Unless otherwise noted, all chemicals were obtained from, or are available from, chemical suppliers such as Aldrich Chemical Company, Milwaukee, Wis. Reactions were carried out at room temperature (about 23° C.), unless otherwise noted.

Method for Measuring Particle Size

Particle size distribution was measured by Dynamic Light Scattering (DLS) using a Malvern Instruments Zetasizer-NanoZS™ particle size analyzer (available from Malvern Instruments, Malvern, U.K.). 15.625 weight percent (% w/w) dispersions or sols of sample compositions were prepared in water for DLS measurements. A small (50-200 microliters) aliquot was taken from each sol and diluted with 2 mL of water. The resulting diluted sample was mixed well and then transferred to a plastic cuvette. Light scattering data was recorded with the sample temperature set at 25° C. For transforming autocorrelation function into particle size, standard values for the viscosity ($0.8872 \times 10^{-3}$ Pa·s; 0.8872 cp) and refractive index (1.33) of water at 25° C. were used. A value of 1.428 was used as the refractive index for amorphous silica. The reported Z-average diameter (average particle diameter, d, in nm) was based upon an intensity weighted distribution. All results are reported in terms of particle size, d (nm).

Method for Analyzing Sols Using High Performance Liquid Chromatography (HPLC)

Particle dispersions or sols were analyzed by HPLC (using an Agilent 1100 series liquid chromatograph, available from Agilent Technologies, Santa Clara, Calif.) with respect to retention time of the resulting effluent through the chromatography column of the chromatograph. In general, small (50-200 microliters) aliquots were taken from sample compositions prepared as sols (according to the Comparative Examples and the Examples described below) and diluted with excess solvent used in the mobile phase of the liquid chromatograph (for example, 2-methoxyethanol or tetrahydrofuran (THF)). The resulting diluted aliquot was mixed well and then transferred to a small vial capped with a septum. HPLC data was recorded with the column temperature set at 40° C. and using 20 microliter injection volumes. The instrument detector measured absorption spectra of the resulting effluent in a wavelength range from 190-900 nanometers (nm) at 2 nm increments. Signals (retention time vs. absorbance) were generated for absorbance peaks of interest associated with the analytes in question. For example, absorbance peaks at 258 nm, 305 nm, 355 nm, and 575 nm were interrogated for retention time for a photochromic dye (Reversacol™ Midnight Grey, described below) entrapped in organically-modified silica (prepared from phenyltrimethoxysilane) nanoparticles diluted in THF. All results are reported in terms of retention time in minutes.

Example 1

Preparation of Organically-Modified Silica Nanoparticles from Phenyltrimethoxysilane (PhTMS) Including a Photochromic Organic Dye Preparation of "Solution 1":

12.5 mL of deionized water was charged into a 25 mL Erlenmeyer flask followed by 9.4 microliters of a sodium hydroxide solution (8M). 1 g of benzethonium chloride (97 weight percent (wt %), Alpha Aesar, Ward Hill, Mass.) was added to the flask, and the resulting mixture was stirred until the benzethonium chloride was completely dissolved.

Preparation of "Solution 2":

300 mg of a photochromic organic dye (a naphthopyran (chromene) dye obtained from PPG Industries, Pittsburgh, Pa. under the trade designation "PHOTOSOL™7-49") was dissolved in 30 mL of phenyltrimethoxysilane (97 wt %, Alpha Aesar, Ward Hill, Mass.) and filtered using a 1 micron glass fiber syringe filter (obtained from Pall Life Sciences, Port Washington, N.Y.).

For Example 1(a), 2.35 mL of Solution 2 was added to Solution 1 at a rate of approximately 0.5 mL/minute with stirring. The resulting mixture was stirred for approximately 2 hours to provide a particle dispersion or sol. The average size of the resulting organically-modified silica particles of the sol was determined by dynamic light scattering (essentially as described above) to be 103.9 nm.

The particles were then precipitated by adding an excess of ethanol to the sol. The resulting precipitate was vacuum filtered using a glass fiber filter (A/D 3 micron, obtained from Pall Life Sciences, Port Washington, N.Y.). The resulting isolated material was dried in an oven at 60° C. for approximately 2 hours. The resulting material was then re-suspended in methyl ethyl ketone.

Example 1(b) was prepared by following essentially the same procedure as used for Example 1(a), except that the reaction solution (resulting mixture of Solutions 1 and 2) was heated to 50° C. The resulting particles had an average particle size of 94.2 nm as determined by dynamic light scattering.

Example 1(c) was prepared by following essentially the same procedure as used for Example 1(a), except that the addition rate of Solution 2 to Solution 1 was 1.2 mL/minute. Average particle size of the resulting particles was determined by dynamic light scattering to be 89.9 nm.

Example 2

Preparation of Organically-Modified Silica Nanoparticles from Phenyltrimethoxysilane (PhTMS) Including a Photochromic Organic Dye 2.35 mL of a solution of a photochromic organic dye (a naphthopyran (chromene) dye obtained from James Robinson, UK, under the trade designation Reversacol™ Midnight Grey) in phenyltrimethoxysilane (10 mg/g) was mixed with 12.5 mL of a solution of sodium hydroxide and benzethonium chloride (prepared by following essentially the procedure described in Example 1 for Solution 1) using a syringe pump at a rate of 0.1 mL/minute while stirring. The resulting mixture was stirred for approximately 2 hours to provide an aqueous particle dispersion or sol.

The resulting particles were isolated by the addition of ethyl acetate directly to the aqueous sol. A 1:1 volume addition of ethyl acetate to the aqueous sol was found to completely transfer the particles into the resulting organic phase upon separation.

Comparative Example A

Preparation of Organically-Modified Silica Nanoparticles from Phenyltrimethoxysilane Including a Photochromic Organic Dye in the Presence of Solvent For Comparative Example A, 1 mL of a 1 wt % toluene solution of a photochromic organic dye (a naphthopyran (chromene) dye obtained from James Robinson, UK, under the trade designation Reversacol™ Midnight Grey) was mixed with 1 mL of phenyltrimethoxysilane. The resulting dye/silane/toluene mixture was added to 12.5 mL of a solution of sodium hydroxide and benzethonium chloride (prepared by following essentially the procedure described in Example 1 for Solution 1) using a variable flow mini-pump (obtained from VWR, West Chester, Pa.) at a rate of 0.08 mL/minute while stirring. The resulting mixture was stirred for approximately 2 hours to provide an aqueous particle dispersion or sol.

The resulting particles were isolated by the addition of an excess amount of ethyl acetate directly to the aqueous sol. Upon phase transfer of the particles, the resulting organic phase was collected using a separatory funnel.

Comparative Example B

Preparation of Organically-Modified Silica Nanoparticles from Phenyltrimethoxysilane Including a Photochromic Organic Dye in the Presence of Solvent For Comparative Example B, 1 mL of a 1 wt % N-methyl-2-pyrrolidone (NMP) solution of a photochromic organic dye (a naphthopyran (chromene) dye obtained from James Robinson, UK, under the trade designation Reversacol™ Midnight Grey) was mixed with 1 mL of phenyltrimethoxysilane. The resulting dye/silane/NMP mixture was added to 12.5 mL of a solution of sodium hydroxide and benzethonium chloride (prepared by following essentially the procedure described in Example 1 for Solution 1) using a variable flow mini-pump (obtained from VWR, West Chester, Pa.) at a rate of 0.08 mL/minute while stirring. The resulting mixture was stirred for approximately 2 hours to provide an aqueous particle dispersion or sol.

The resulting particles were isolated by the addition of an excess amount of ethyl acetate directly to the aqueous sol. Upon phase transfer of the particles, the resulting organic phase was collected using a separatory funnel.

Sol samples from Example 2 and Comparative Examples A and B (as well as samples of their precursor components) were analyzed by HPLC as described above. For the analysis, each sample was diluted using an excess of 2-methoxyethanol. The phenyltrimethoxysilane (PhTMS) sample was neat before dilution. The Reversacol™ Midnight Grey sample was 1 wt % in toluene before dilution into the 2-methoxyethanol. The Reversacol™ Midnight Grey/PhTMS sample was the neat ceramic precursor solution containing dye at 10 mg/g concentration before dilution into the 2-methoxyethanol. Analysis of the sols was carried out after isolation into ethyl acetate. Wavelengths used for absorbance peak detection were chosen based on spectrophotometric analysis of the samples in 2-methoxyethanol. In particular, an absorbance peak at 260 nm was chosen for detection, as it was observed for, and appeared to be characteristic of, both phenyltrimethoxysilane and Reversacol™ Midnight Grey dye. The resulting retention time data is shown in Table 1 below.

TABLE 1

| Sample | Retention Time (minutes) Measured at Wavelength of Absorbance Peak, 260 nm |
| --- | --- |
| PhTMS | 1.2 |
| Reversacol ™ Midnight Grey | 1.4 |
| Reversacol ™ Midnight Grey/PhTMS | 1.2, 8.2 |
| Example 2 | 1.1 |
| Comparative Example A | 1.0, 1.2, 1.4, 6.2 |
| Comparative Example B | 1.2, 5.7 |

Results from the HPLC analysis show clear differences in retention time, depending upon the composition and processing of each sample. The data in Table 1 shows that the presence of solvent (and the type of solvent present) during particle preparation affected the measured retention times of the samples.

Example 3

Preparation of Organically-Modified Silica Nanoparticles from Phenyltrimethoxysilane and Isooctyltrimethoxysilane Including a Photochromic Organic Dye 2.4 mL of a solution of a photochromic organic dye (a naphthopyran (chromene) dye obtained from James Robinson, UK, under the trade designation Reversacol™ Midnight Grey) in phenyltrimethoxysilane (10 mg/g) was mixed with 2.4 mL of isooctyltrimethoxysilane (Wacker Chemical Corporation, Adrian, Mich.) and drawn into a 5 mL syringe. The resulting dye/silane mixture was added to 12.5 mL of a solution of sodium hydroxide and benzethonium chloride (prepared by following essentially the procedure described in Example 1 for Solution 1) using a syringe pump at a rate of 0.1 mL/minute while stirring. The resulting mixture was stirred for approximately 2 hours to provide an aqueous particle dispersion or sol. Average particle size of the resulting particles was determined by dynamic light scattering to be 77.5 nm in diameter.

The resulting particles were isolated by the addition of ethyl acetate directly to the aqueous sol. A 1:1 volume addition of ethyl acetate to the aqueous sol was found to completely transfer the particles into the resulting organic phase upon separation.

The resulting sol (isolated organic phase) was analyzed by HPLC using absorbance peaks observed at 258, 305, 360, and 575 nm wavelengths. The isolated organic phase (particles in ethyl acetate) was diluted with THF for analysis. The results are shown in Table 2 below.

TABLE 2

| Sample | Retention Time (minutes) Measured at Wavelength of Absorbance Peak | | | |
|---|---|---|---|---|
| | 258 nm | 305 nm | 360 nm | 575 nm |
| Example 3 | 0.93 | 0.93 | 0.93 | 0.94 |

A retention time of about 0.93 minute was observed at each of the selected absorbance peak wavelengths. This result is consistent with the dye being entrapped in the particle. The observed peak absorbance at 575 nm indicates that the dye was switched to its colored state when illuminated by the spectrophotometer source and that the dye maintained function within the particle matrix.

Example 4

Preparation of Organically-Modified Silica Nanoparticles from Phenyltrimethoxysilane and a Polyethylenoxytriethoxysilane Including a Photochromic Organic Dye For Example 4(a), 0.96 mL of a solution of a photochromic organic dye (a naphthopyran (chromene) dye obtained from James Robinson, UK, under the trade designation Reversacol™ Midnight Grey) in phenyltrimethoxysilane (10 mg/g) was mixed with 2.4 mL of a polyethylenoxytriethoxysilane (a poly(ethylene glycol)triethoxysilane with a molecular weight of about 500, obtained from Momentive Performance Materials, Wilton, Conn. under the trade designation "SILQUEST™ A1230"), drawn into a 5 mL syringe, and added to 12.5 mL of a solution of sodium hydroxide and benzethonium chloride (prepared by following essentially the procedure described in Example 1 for Solution 1) using a syringe pump at a rate of 0.1 mL/minute while stirring. The resulting mixture was stirred for approximately 2 hours to provide an aqueous particle dispersion or sol. Average particle size of the resulting particles was determined by dynamic light scattering to be 143.3 nm.

The resulting particles were isolated by the addition of excess ethyl acetate to the aqueous sol. The resulting organic phase was collected upon complete transfer of the particles into the ethyl acetate solvent.

For Example 4(b), 1.0 mL of a solution of a photochromic organic dye (a naphthopyran (chromene) dye obtained from James Robinson, UK, under the trade designation Reversacol™ Midnight Grey) in phenyltrimethoxysilane (10 mg/g) was added to 12.5 mL of a solution of sodium hydroxide and benzethonium chloride (prepared by following essentially the procedure described in Example 1 for Solution 1) at a rate of 0.1 mL/minute. Upon complete addition of the dye-silane solution, 2.6 mL of the above-described polyethylenoxytriethoxysilane (obtained from Momentive Performance Materials, Wilton, Conn. under the trade designation "SILQUEST™ A1230") was added to the resulting mixture at a rate of 0.1 mL/minute. The resulting final mixture was stirred for approximately 2 hours to provide an aqueous particle dispersion or sol. Average particle size of the resulting particles was determined by dynamic light scattering to be 94.1 nm in diameter.

The resulting particles were isolated by the addition of excess ethyl acetate to the aqueous sol. The resulting organic phase was collected upon complete transfer of the particles into the ethyl acetate solvent.

Example 5

Preparation of Organically-Modified Silica Nanoparticles from Phenyltrimethoxysilane and Including a Fluorescent Organic Dye A fluorescent organic dye (a naphthalimide dye obtained from Clariant, Coventry, R.I., under the trade designation "HOSTASOL™ YELLOW 3G") was mixed with 1 mL of phenyltrimethoxysilane to a concentration of 0.7 mg/g. The resulting dye/silane solution was then delivered into 12.5 mL of a solution of sodium hydroxide and benzethonium chloride (prepared by following essentially the procedure described in Example 1 for Solution 1) using a variable flow mini-pump at a rate of approximately 0.08 mL/minute. The resulting mixture was stirred for approximately 2 hours to provide an aqueous particle dispersion or sol.

The resulting particles were collected by the addition of excess ethyl acetate to the aqueous sol. Upon separation, the resulting organic and aqueous layers were isolated.

The referenced descriptions contained in the patents, patent documents, and publications cited herein are incorporated by reference in their entirety as if each were individually incorporated. Various unforeseeable modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only, with the scope of the invention intended to be limited only by the claims set forth herein as follows.

I claim:

1. A process for preparing photoresponsive hybrid organic-inorganic particles comprising
   (a) combining (1) at least one organosilane compound and (2) at least one photoactive material to form a neat ceramic precursor composition, wherein
   the organosilane compound is of Formula (I)

$$Si(R)_{4-p}-(X)_p \qquad (I)$$

wherein each R is independently selected from alkyl, alkenyl, acyl, cycloalkyl, aryl, heteroalkyl, heteroalkenyl, heterocycloalkyl, heteroaryl, and combinations thereof; each X is independently selected from a halogen atom, a hydrogen atom, acyloxy, alkoxy, hydroxyl, and combinations thereof; and p is an integer of 2 or 3, and
   the photoactive material is a photoactive dye, photoactive drug, rare earth-doped metal oxide nanoparticles, metal nanoparticles, semiconductor nanoparticles, or combinations thereof; and
   (b) allowing or inducing hydrolysis and condensation of said organosilane compound to form hybrid organic-inorganic particles comprising said photoactive material, wherein the hydrolysis and condensation are effected by combining, in the absence of an organic solvent, the neat ceramic precursor composition with an aqueous composition comprising at least one catalyst and at least one surfactant.

2. The process of claim 1, wherein each said R is independently selected from alkyl, aryl, heteroalkyl, heteroaryl, and combinations thereof; and each said X is independently selected from halogen, alkoxy, hydroxyl, and combinations thereof.

3. The process of claim 1, wherein p is an integer of 3.

4. The process of claim 1, wherein said organosilane compound is selected from alkyltrialkoxysilanes, aryltrialkoxysilanes, heteroalkyltrialkoxysilanes, and combinations thereof.

5. The process of claim 1, wherein said ceramic precursor composition further comprises at least one ceramic precursor compound other than an organosilane.

6. The process of claim 1, wherein said hybrid organic-inorganic particles are organically-modified silica particles.

7. The process of claim 1, wherein said photoactive material is selected from photoactive dyes and combinations thereof.

8. The process of claim 1, wherein said catalyst is selected from bases, acids, buffered solutions thereof, and combinations thereof.

9. The process of claim 1, wherein said catalyst is selected from bases and combinations thereof.

10. The process of claim 1, wherein said hybrid organic-inorganic particles are hybrid organic-inorganic nanoparticles.

11. A process for preparing photoresponsive hybrid organic-inorganic particles comprising (a) combining (1) at least one neat organosilane compound of Formula (I)

$$Si(R)_{4-p}-(X)_p \qquad (I)$$

wherein each R is independently selected from alkyl, alkenyl, acyl, cycloalkyl, aryl, heteroalkyl, heteroalkenyl, heterocycloalkyl, heteroaryl, and combinations thereof; each X is independently selected from a halogen atom, a hydrogen atom, acyloxy, alkoxy, hydroxyl, and combinations thereof; and p is an integer of 2 or 3, and (2) at least one neat photoactive dye, to form a neat ceramic precursor composition; and (b) allowing or inducing hydrolysis and condensation of said organosilane compound by combining, in the absence of organic solvent, said neat ceramic precursor composition with an aqueous composition comprising at least one base and at least one surfactant, to form organically-modified silica nanoparticles comprising said photoactive dye.

* * * * *

UNITED STATES PATENT AND TRADEMARK OFFICE
CERTIFICATE OF CORRECTION

Page 1 of 1

PATENT NO. : 9,163,145 B2
APPLICATION NO. : 14/126860
DATED : October 20, 2015
INVENTOR(S) : Corey Radloff It is certified that error appears in the above-identified patent and that said Letters Patent is hereby corrected as shown below:

Specification

<u>Column 6</u>
Line 43, delete "napthalimides," and insert -- naphthalimides, --, therefor.

Line 52, delete "aryl oxylates," and insert -- aryl oxalates, --, therefor.

Line 63, delete "napthalimides," and insert -- naphthalimides, --, therefor.

Line 65, delete "napthalimides," and insert -- naphthalimides, --, therefor.

<u>Column 9</u>
Line 45, delete "parastaltic" and insert -- peristaltic --, therefor.

Signed and Sealed this
Third Day of May, 2016

Michelle K. Lee
*Director of the United States Patent and Trademark Office*